(12) United States Patent
Bennetto et al.

(10) Patent No.: US 8,708,626 B2
(45) Date of Patent: Apr. 29, 2014

(54) FREIGHT CARRIER

(75) Inventors: Peter Geoffrey Bennetto, West Beach (ZA); Jack Denys Van Heerden, Pretoria (ZA)

(73) Assignee: ReturnHaulers Proprietary Limited, Cape Town (ZA)

( * ) Notice: Subject to any disclaimer, the term of this patent is extended or adjusted under 35 U.S.C. 154(b) by 0 days.

(21) Appl. No.: 13/393,691

(22) PCT Filed: Sep. 1, 2010

(86) PCT No.: PCT/IB2010/053928
§ 371 (c)(1),
(2), (4) Date: Mar. 1, 2012

(87) PCT Pub. No.: WO2011/027305
PCT Pub. Date: Mar. 10, 2011

(65) Prior Publication Data
US 2012/0155982 A1    Jun. 21, 2012

(30) Foreign Application Priority Data
Sep. 1, 2009    (ZA) .................................... 2009/6059

(51) Int. Cl.
*B60P 3/00*    (2006.01)

(52) U.S. Cl.
USPC .............................................. 410/54; 410/68

(58) Field of Classification Search
USPC .................. 410/32, 44, 29.1, 54, 68; 220/1.5, 220/23.86; 414/495, 540
See application file for complete search history.

(56) References Cited

U.S. PATENT DOCUMENTS

| | | | | |
|---|---|---|---|---|
| 4,430,032 A | * | 2/1984 | Morgan | 410/68 |
| 4,943,204 A | * | 7/1990 | Ehrlich | |
| 5,938,382 A | * | 8/1999 | Andre et al. | 410/24 |
| 7,004,697 B2 | * | 2/2006 | Alaweih | 410/68 |

FOREIGN PATENT DOCUMENTS

| | | |
|---|---|---|
| DE | 102004016812 A1 | 10/2005 |
| DE | 202006002564 U1 | 4/2006 |
| DE | 202009001825 U1 | 8/2009 |
| WO | 96/20850 A1 | 7/1996 |
| WO | 01/58717 A1 | 8/2001 |

OTHER PUBLICATIONS

International Search Report issued in PCT/IB2010/053928 dated Dec. 10, 2010, 4 pages.

* cited by examiner

*Primary Examiner* — Stephen Gordon
(74) *Attorney, Agent, or Firm* — Rothwell, Figg, Ernst & Manbeck, P.C.

(57) ABSTRACT

A freight carrier (10) in the form of a flatbed road trailer of the side loading type, has a load deck (16) and includes two bulk container tanks (20.1) and (20.2) for carrying liquid freight. The carrier includes lifting arrangements at opposite ends of the tanks for lifting the tanks into the raised positions illustrated, so as to define stowage compartments under the tanks within which general dry freight can be supported on the load deck. The trailer transports liquid freight when the tanks are in their lowered positions adjacent the load deck. When the tanks are empty, they are raised for the transport of dry freight.

6 Claims, 15 Drawing Sheets

FREIGHT CARRIER

CROSS REFERENCE TO RELATED APPLICATIONS

This application is a 35 U.S.C. §371 National Phase Entry Application from PCT/IB2010/053928, filed Sep. 1, 2010, and designating the United States, which claims priority under 35 U.S.C. §119 to South African Patent Application No. 2009/06059 filed Sep. 1, 2009, which is incorporated herein in its entirety.

FIELD OF INVENTION

The invention relates to a freight carrier. More specifically, the invention relates to a freight carrier for the carriage of fluid freight and general dry freight. The invention also relates to a container arrangement for a freight transportation vehicle providing for the carriage of fluid freight and general dry freight.

BACKGROUND TO INVENTION

The costs associated with the transportation of freight are high. One way of reducing these costs is to eliminate deadheading which involves making a one-way empty trip for lack of suitable freight for the freight carrier.

Dual-purpose road tankers for avoiding deadheading have been in operation in countries like Finland, Norway, Denmark, Sweden, Russia for some time. These have been manufactured mainly for the transport of fuel to forestry operations and then forestry products back to market. These dual-purpose road tankers are configured to allow the support of general dry freight on top of liquid tanks. With the introduction of new ADR (Agreement on Dangerous Goods by Road) regulations in 2004, all new road tankers built need to comply with these regulations which require inter alia: more pronounced roll over protection clearances on the top side of tanks; minimum tank shell thicknesses for tanks and bulkheads and tank ends; and minimum and maximum radii on tank shells meaning these road tankers need to be elliptical in cross-sectional profile and cannot have the squarish cross-sectional profiles or flatter (large radius) sides that were previously possible.

The resultant elliptical tanks do not lend themselves to transporting general dry freight on their top sides as these top sides are radiussed and are not flat.

It is an object of the present invention to provide a dual-purpose freight carrier which avoids the problem of deadheading and which is able to operate within transport vehicle height, width and length restrictions, while still at the same time complying with the abovementioned ADR regulations, providing a safe centre of gravity while transporting freight and providing for ease of loading and unloading of freight.

SUMMARY OF INVENTION

According to a first aspect of the invention, there is provided a container arrangement for a freight transportation vehicle of the side loading type having a load deck, the container arrangement providing for the carriage of fluid freight and general dry freight and including:

a bulk container vessel for holding the fluid freight, which is supported on the load deck of the vehicle; and lifting means mounted to the freight transportation vehicle, for displacing the bulk container vessel between a lowered position wherein the bulk container vessel is disposed adjacent the load deck and a raised position wherein the bulk container vessel is spaced above the load deck so as to define a stowage compartment between the load deck and the bulk container vessel in which the general dry freight can be stowed and supported on the load deck.

The container arrangement may include a rigid front panel which is mounted to the load deck in an upright orientation at an operative front end of the bulk container vessel and a rigid rear panel which is mounted to the load deck in an upright orientation at an operative rear end of the bulk container vessel, each panel being of a height which is at least equal to the height of the stowage compartment, thereby to substantially close off the front and rear ends of the stowage compartment.

In one embodiment of the invention, the lifting means may comprise a first scissor jack arrangement disposed at the front end of the bulk container vessel and a second scissor jack arrangement disposed at the rear end of the bulk container vessel.

In another embodiment of the invention, the lifting means may comprise a first hydraulically-operable piston/cylinder lifting arrangement at the front end of the bulk container vessel and second hydraulically-operable lifting arrangement at the rear end of the bulk container vessel.

In yet another embodiment of the invention, the lifting means may comprise a first pneumatically-operable piston/cylinder lifting arrangement at the front end of the bulk container vessel and a second pneumatically-operable piston/cylinder lifting arrangement at the rear end of the bulk container vessel.

The container arrangement may include releasable mounting means for releasably securely mounting the bulk container vessel to the load deck of the vehicle chassis when the bulk container vessel is in its lowered position.

The bulk container vessel may be releasably connected to the lifting means in an arrangement permitting the bulk container vessel to be disconnected from the lifting means thereby to permit the separation of the container vessel from the lifting means.

According to a second aspect of the invention, there is provided a freight carrier for the carriage of fluid freight and general dry freight, the freight carrier being of the side loading type and including:

a vehicle chassis including a load deck on which the general dry freight can be supported; and the container arrangement as described and defined hereinabove in accordance with the first aspect of the invention, which is mounted to the load deck of the vehicle chassis.

BRIEF DESCRIPTION OF THE DRAWINGS

Further features of the invention are described hereinafter by way of a non-limiting example of the invention, with reference to and as illustrated in the accompanying diagrammatic drawings. In the drawings.

DESCRIPTION OF PREFERRED EMBODIMENTS

With reference to FIGS. 1 to 19 of the drawings, a freight carrier in accordance with the invention, in the form of a flatbed road trailer of the side loading type, is designated generally by the reference numeral 10. The trailer 10 is of a type which can be hitched to a tractor 12 and comprises, broadly, a chassis 14 having a load deck 16, and a container arrangement 18 which includes a pair of bulk container vessels for carrying liquid freight in the form of tanks 20.1 and 20.2.

The trailer 10 has a front end 22 and a rear end 24 and has two pairs of road-engaging wheels 26 near the rear end of the trailer. The load deck has a generally rectangular configuration and defines a flat upper support surface on which general dry freight can be supported as will be explained in more detail hereinafter.

The load deck 16 has a downwardly projecting coupler kingpin 17 near its front end for coupling the trailer to the tractor 12. The load deck 16 also has a number of standard twist locks 28 which are configured to cooperate with standard mounting blocks 29 connected to the tanks 20.1 and 20.2 for releasably securely mounting the tanks to the load deck as will be explained in more detail hereinafter.

The tanks 20.1 and 20.2 are configured for holding fluid freight such as liquid fuel. The container arrangement 18 further includes displacement means in the form of scissor jack lifting arrangements 30 which are mounted to the load deck 16 at opposite ends of each of the tanks. Each scissor jack arrangement 30 includes a lower pivoting arm arrangement 32, an upper pivoting arm arrangement 34, a lifting beam 36, a pair of lifting chains 38.1 and 38.2 and an actuator in the form of an hydraulic ram 40. The scissor jack arrangement 30 further includes two spaced upright support posts 41.1, 41.2 which are disposed at opposite sides of the pivoting arms and provide a cradle for the lifting beam 36 when the upper and lower pivoting arm arrangements are in a retracted position. The lower pivoting arm arrangement 32 comprise two pivot arms 42.1, 42.2 which are pivotally connected to one another intermediate their lengths. The scissor jack arrangement 30 includes a mounting lug 44 which is bolted to the load deck and the lower end of the arm 42.1 is pivotally connected to the mounting lug 44. The scissor jack arrangement 30 includes a slide rail 46 which is bolted to the load deck 10 and the lower end of the arm 42.2 includes a roller 48 which allows for displacement of the lower end of the pivotal arm 42.2 along a track provided by the slide rail 46. The upper pivoting arm arrangement 34 comprises two arms 50.1 and 50.2 which are pivotally connected to one another intermediate their lengths. The lower end of the arm 50.1 is pivotally connected to the upper end of the arm 42.2, while the lower end of the arm 50.2 is pivotally connected to the upper end of the arm 42.1. The upper end of the arm 50.2 is pivotally connected to the lifting beam 36. The lifting beam defines a slot and the upper end of the pivot arm 50.1 has a guide pin 54 which is pivotally received within the slot 52 so as to permit displacement of the pin 54 along the slot 52.

The mounting blocks 29 of the tanks 20.1 and 20.2 are connected to the tanks at opposite ends thereof by means of connecting arms 54. The mounting blocks 29 are in the form of standard corner blocks which are fixed in the corners of shipping containers of the type having an elongate, box-like structure with an access door at one of their ends. Shipping containers of this type and the mounting blocks 29 have become nationally and internationally standardised (by the International Standards Organisation) and are configured for mounting to the standard twist locks 28. A pair of mounting blocks 29 are located at each end of each tank. More specifically, the mounting blocks of each pair of mounting blocks are located at the corners at the ends of the tanks.

Figure 1:
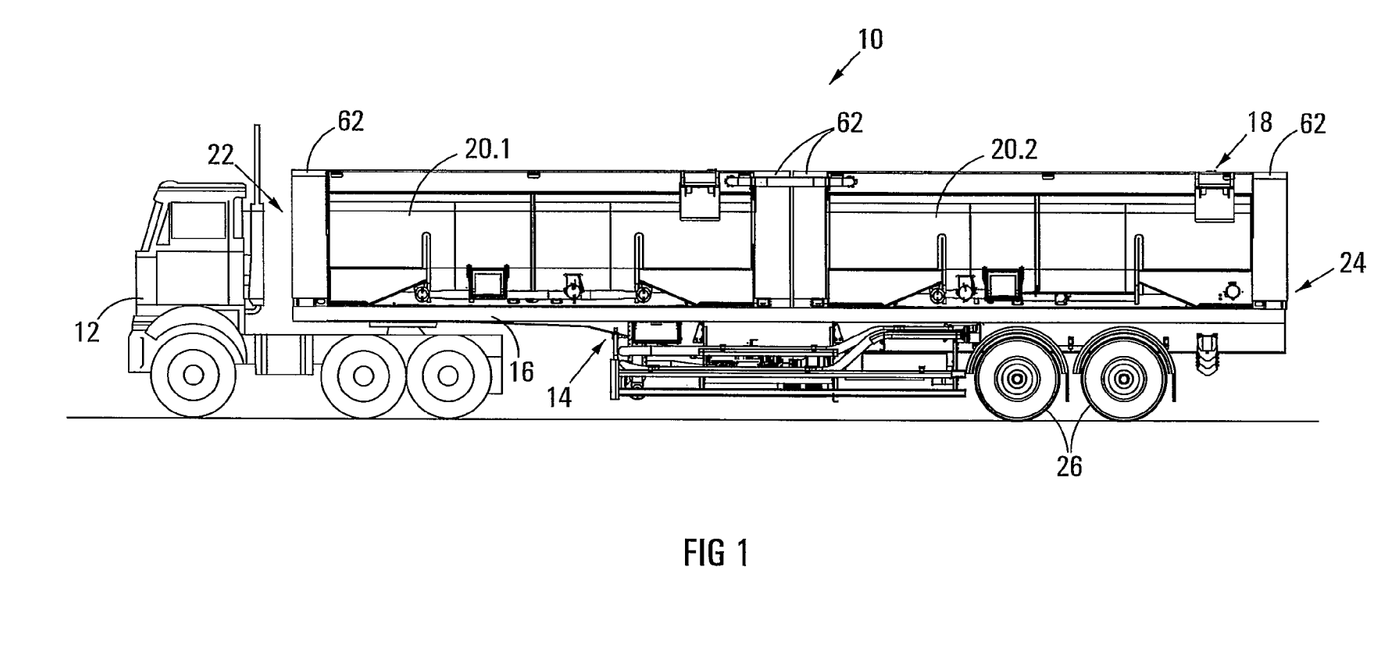
FIG. 1 shows a side view of a freight carrier in accordance with the invention, mounted to a tractor.
Figure 2:
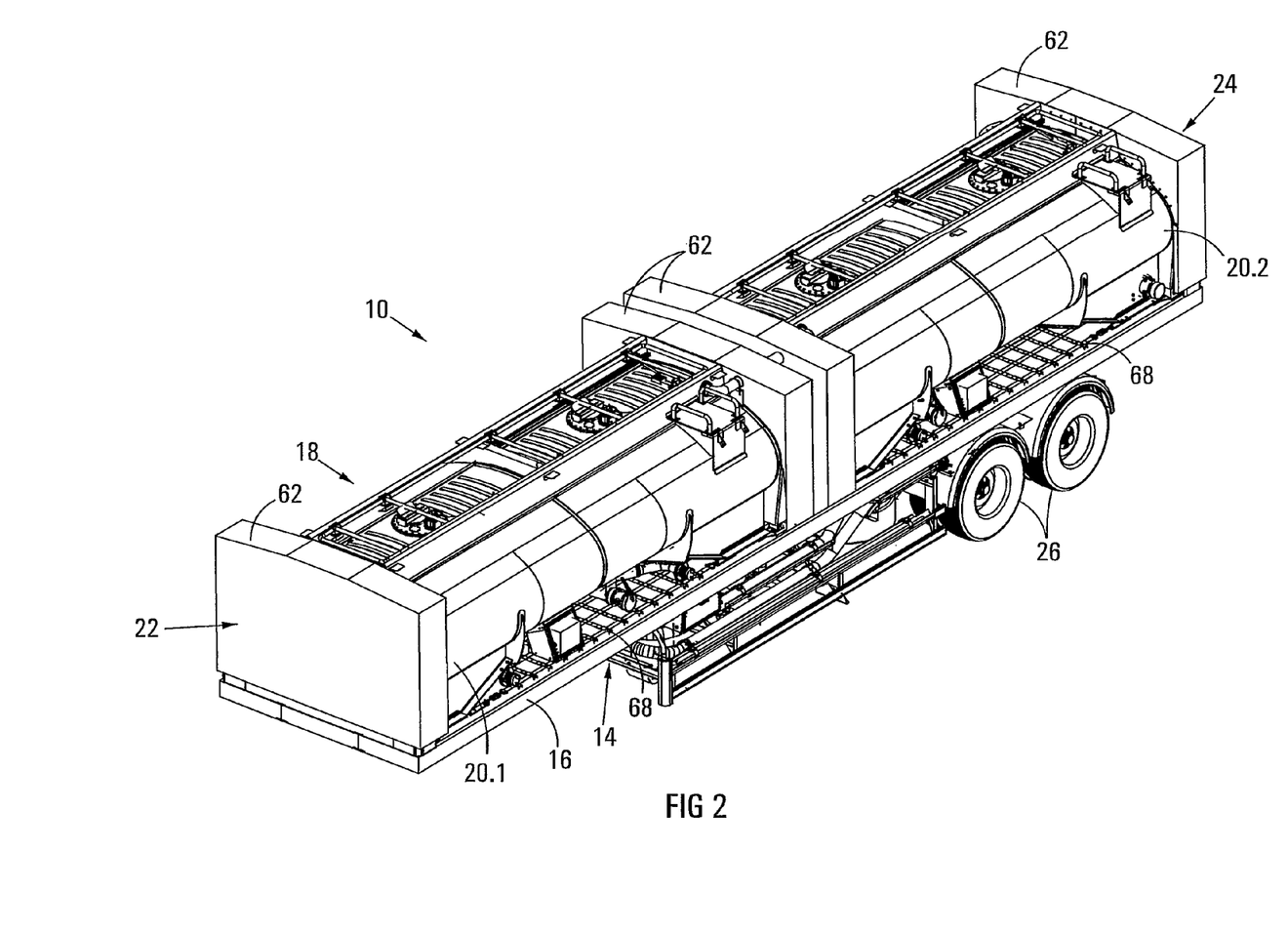
FIG. 2 shows a perspective view from the front, of the freight carrier of FIG. 1, with the tanks thereof in their lowered positions.
Figure 3:
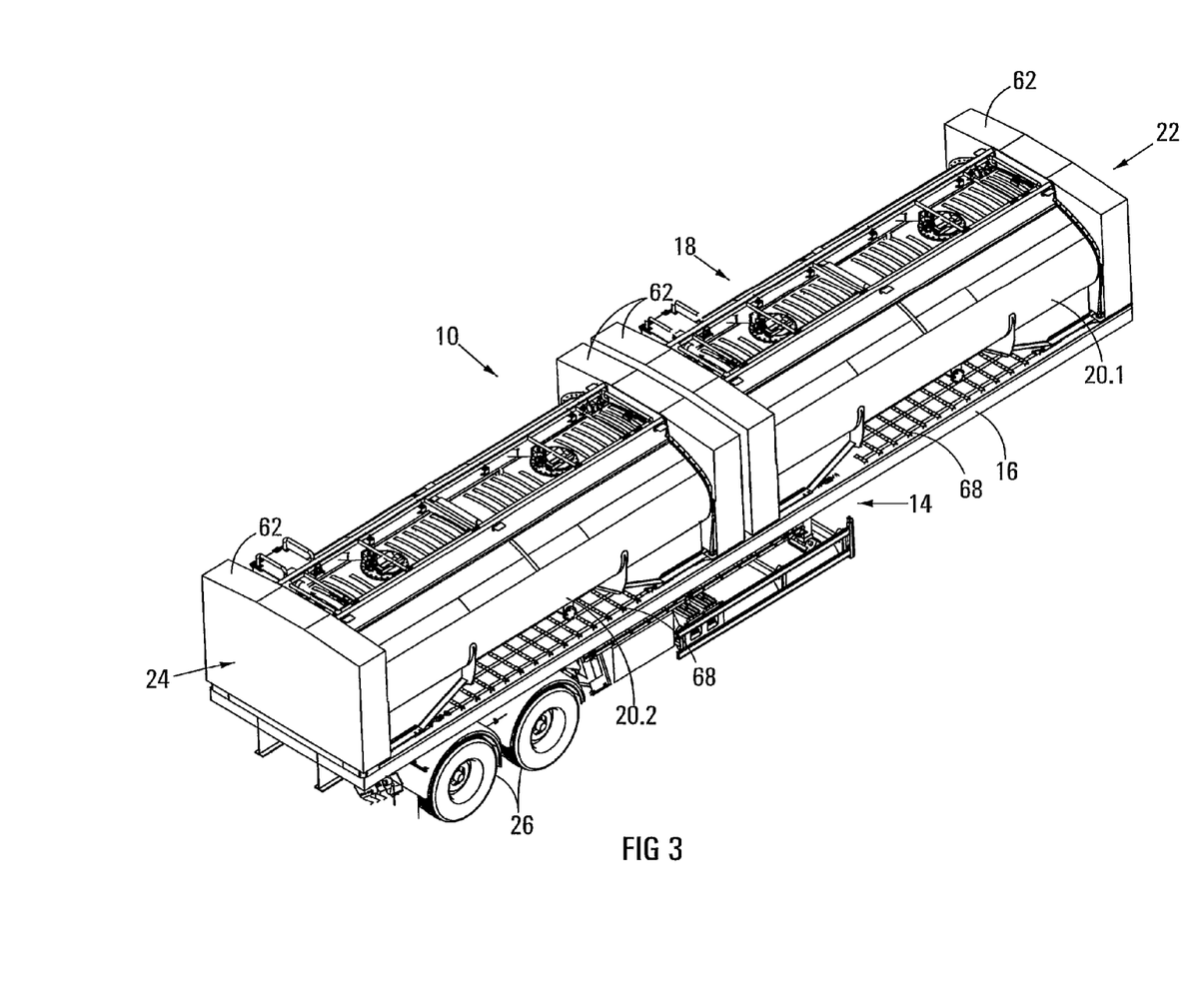
FIG. 3 shows a perspective view from the rear, of the freight carrier of FIG. 1, with the tanks thereof in their lowered positions.
Figure 4:
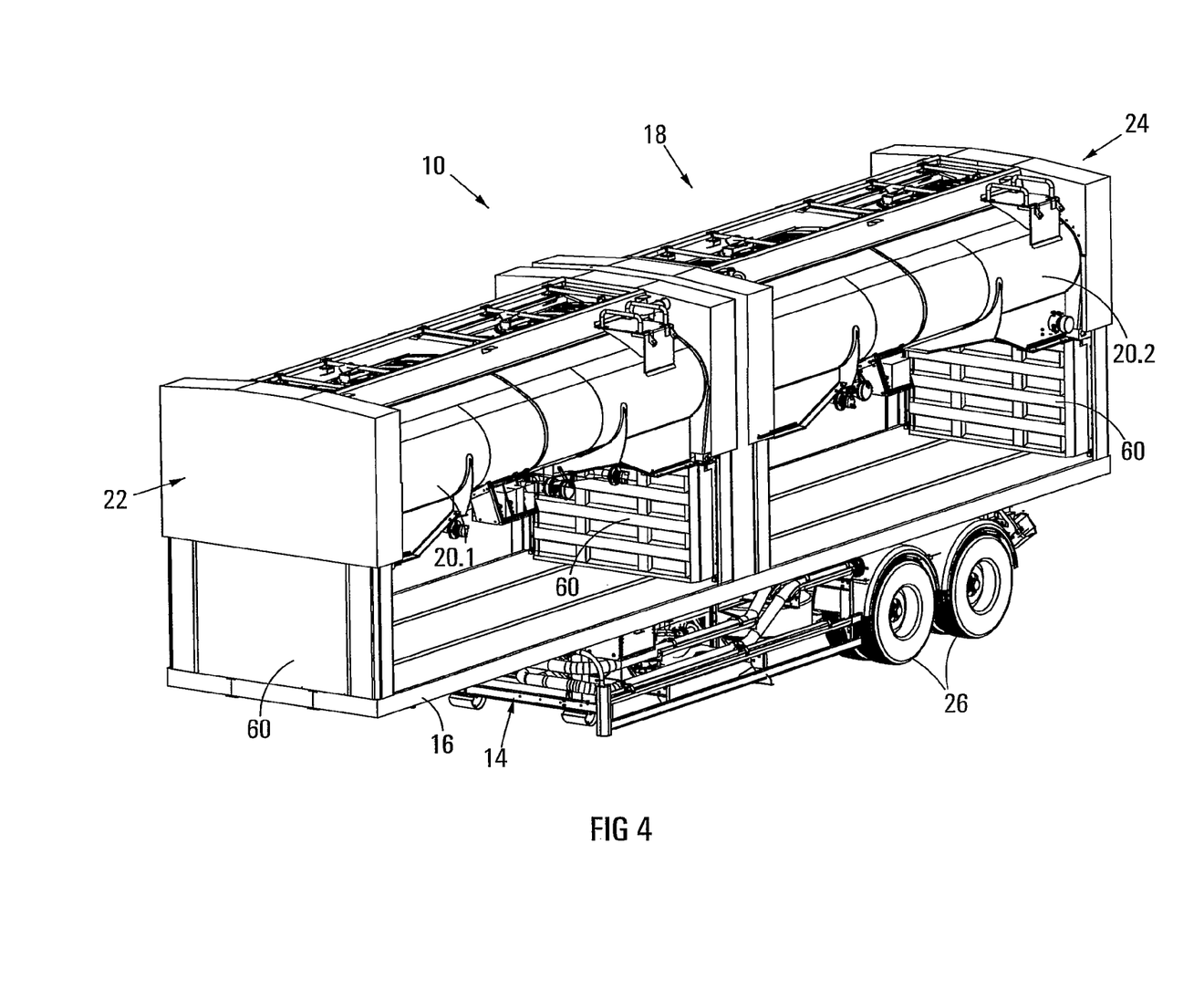
FIG. 4 shows a perspective view from the front, of the freight carrier of FIG. 1, with the tanks thereof in their raised positions.
Figure 8:
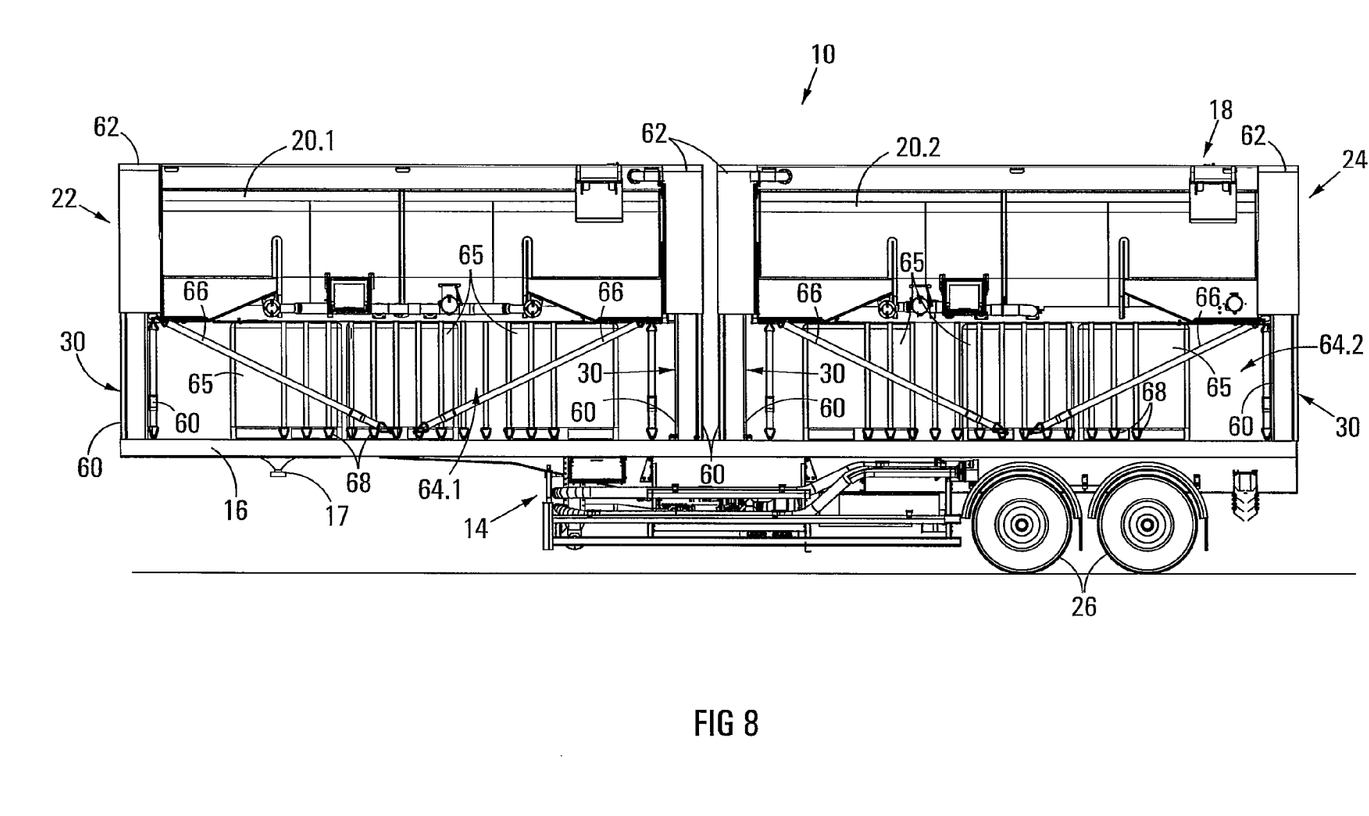
FIG. 8 shows a side view of the freight carrier of FIG. 1, with the tanks thereof in their raised positions and general dry freight stowed in the stowage compartment.
Figure 9:
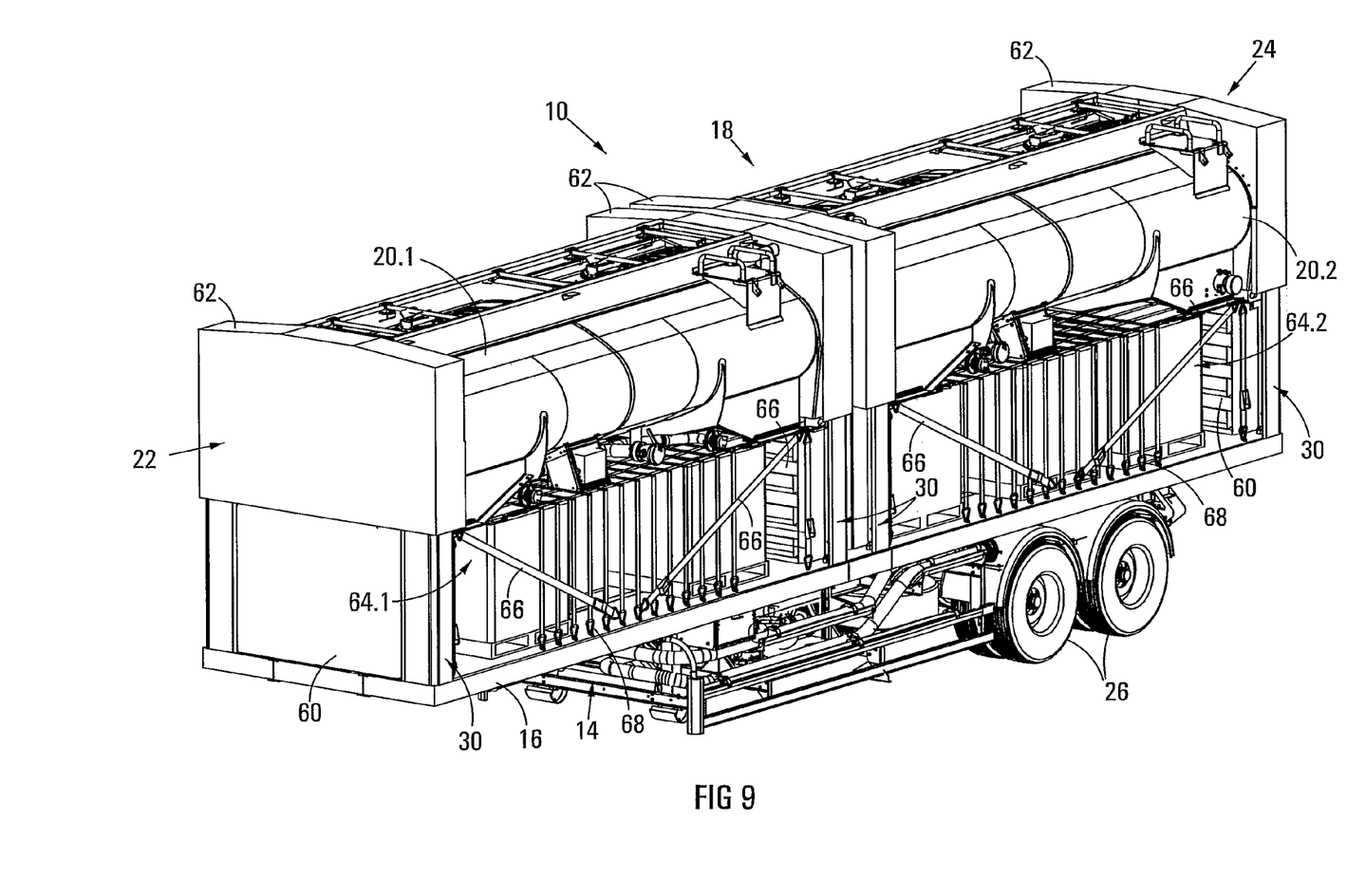
FIG. 9 shows a perspective view from the front, of the freight carrier of FIG. 1, with the tanks thereof in their raised positions and general dry freight stowed in the stowage compartment.

The lifting arrangements 30 are operable to displace the tanks 20.1 and 20.2 between lowered positions wherein tanks are disposed adjacent the load deck (as is shown in FIGS. 1, 2 and 3 of the drawings) and raised positions wherein the tanks are spaced above the load deck (as is shown in FIGS. 8 and 9) so as to define a stowage compartment between the load deck and the tanks in which general dry freight can be stowed and supported on the load deck as will be explained in further detail hereinafter.

Figure 5:
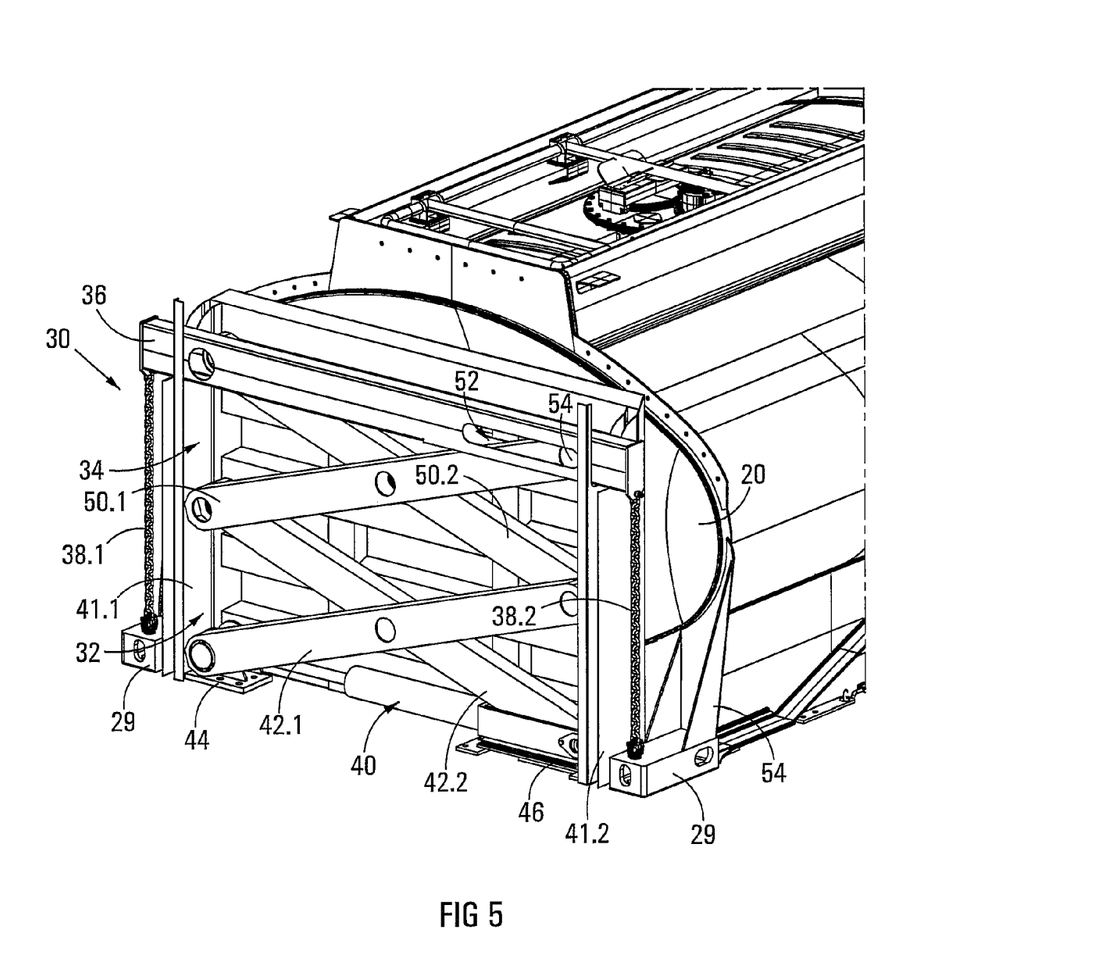
FIG. 5 shows an enlarged perspective view of the scissor jack arrangement of the freight carrier of FIG. 1, in a retracted position.
Figure 6:
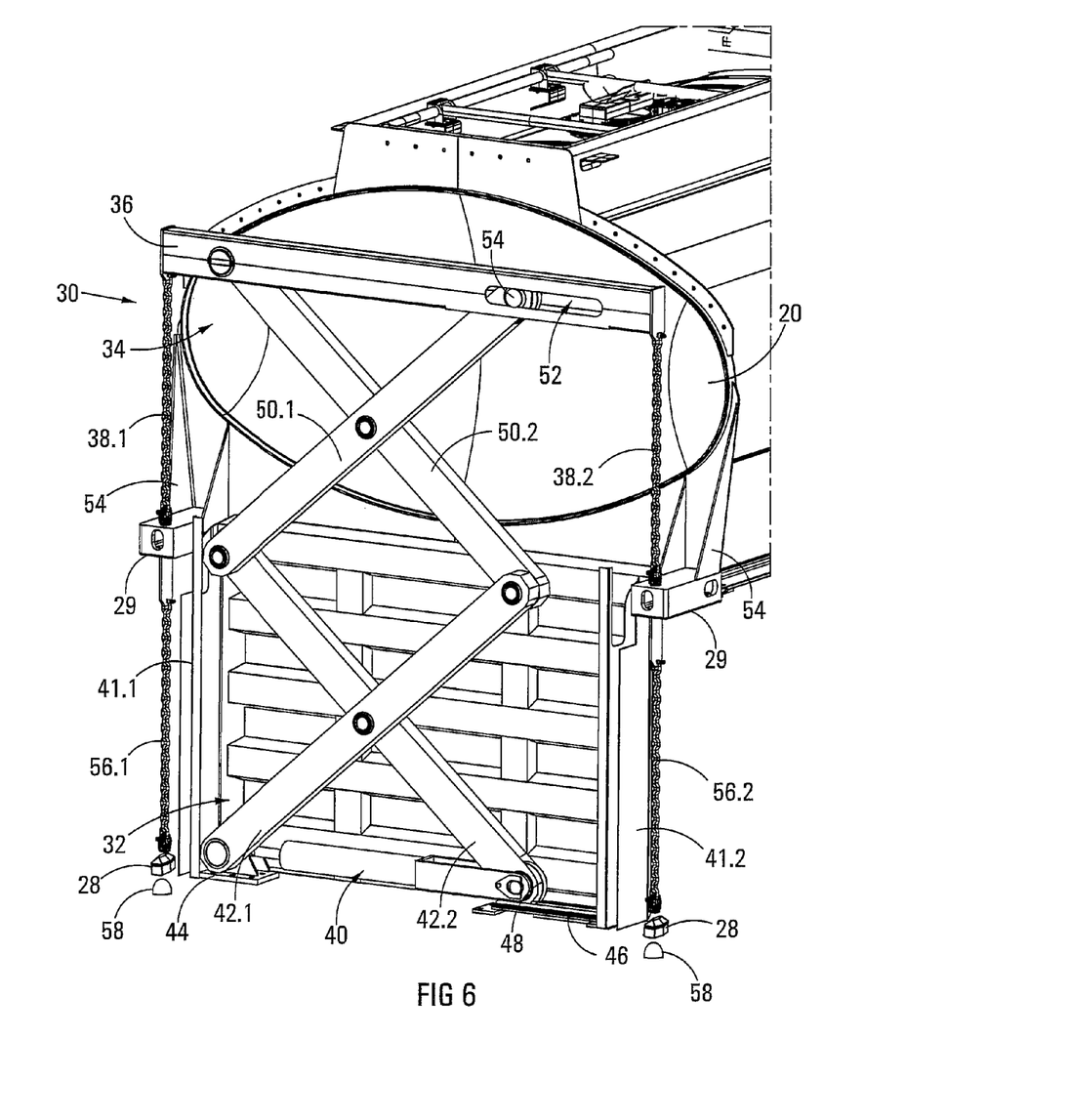
FIG. 6 shows an enlarged perspective view of the scissor jack arrangement of the freight carrier of FIG. 1, in an extended position.

FIG. 5 shows one of the scissor jack lifting arrangements 30 in a retracted position wherein the tank associated with the lifting arrangement 30 is in a lowered position. FIG. 6 shows the scissor jack lifting arrangement 30 in an extended position wherein the tank associated therewith is in a raised position.

The lifting chains 38.1 and 38.2 extend between the lifting beam 36 and the mounting blocks 29. More specifically, with reference to FIGS. 5 and 6 of the drawings, the lifting chain 38.1 is disposed adjacent the support post 41.1 and is connected at an upper end thereof, to the left hand end of the lifting beam 36 and at a lower end thereof, by means of a shackle, to a lug projecting from the mounting block 29 located adjacent the support base 41.1. In similar fashion, the lifting chain 38.2 is connected at its upper end, to the right hand side of the lifting beam 36 and at its lower end, by means of a shackle, to a lug projecting from the mounting block 29 located adjacent the support post 41.2.

Each lifting arrangement 30 further include retaining chains 56.1 and 56.2 which have been provided as a safety feature which limit displacement of the tanks beyond a maximum height relative to the load deck. More specifically, the retaining chain 56.1 is disposed adjacent the support post 41.1 and is connected at its upper end, to the mounting block 29 adjacent the post 41.1 and at its lower end, by means of a shackle, to a mounting lug 58 fixed to the load deck 10. Similarly, the retaining chain 56.2 is disposed adjacent the support post 41.2 and is connected at its upper end to the mounting block 29 adjacent the post 41.2 and at its lower end, by means of a shackle, to a mounting lug 58 fixed to the load deck 10.

Figure 7A:
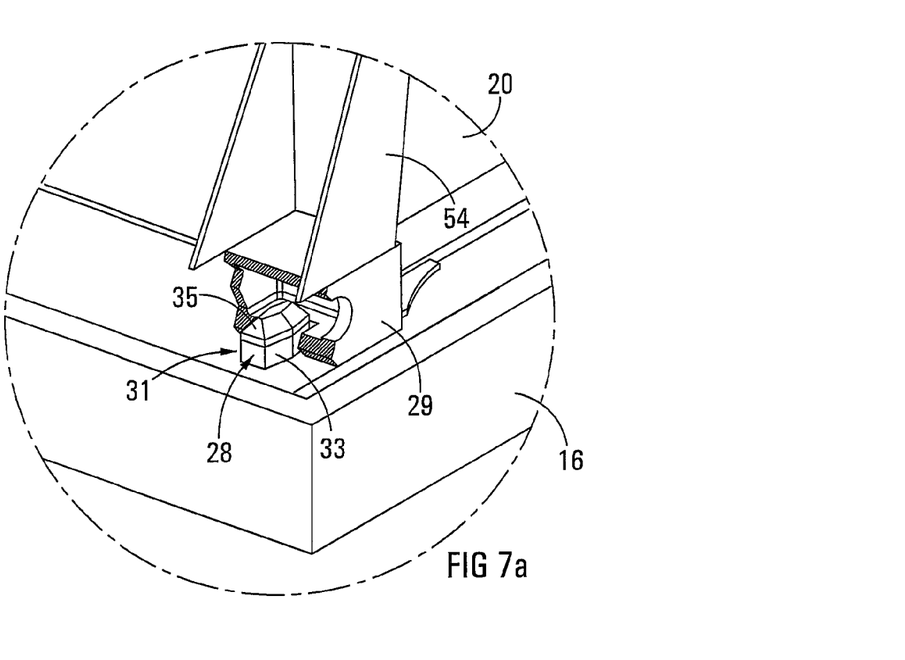
FIGS. 7a and 7b show enlarged fragmentary perspective views of a twist lock and corresponding mounting block for releasably locking the tanks to the load deck of the freight carrier.
Figure 7B:
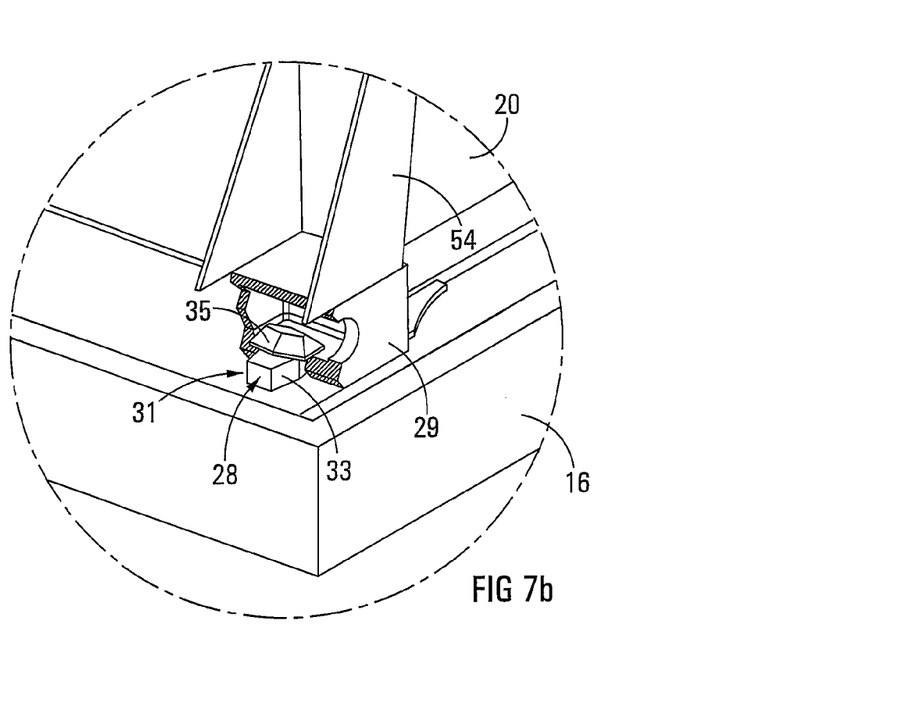

With reference to FIGS. 7a and 7b of the drawings, the manner in which the mounting block 29 is releasably secured to a twist lock 38 fitted to the load deck 16, is illustrated. The mounting blocks 29 provide feet on which the tanks 20.1 and 20.2 rest on the load deck. When the tanks are in their lowered position, the mounting blocks 29 are located on the twist locks 28 and securely engaged thereby, thereby securely mounting the tanks to the load deck. Each mounting block 29 is hollow and is provided with an aperture in a base plate thereof to cooperatively receive a compatible twist locking device of a relevant one of the twist locks 28. The locking device releasably prevent the mounting block from being separated from the twist lock. With reference to FIGS. 7 and 7b, it can be seen that each twist lock 28 includes a twist locking device 31 which projects from the load deck 10 and which is received in the complementary aperture defined in the base plate of the corresponding mounting block 29. The twist locking device comprises a base formation 33 which is fixed to the load deck 16 and a twist formation 35 which is mounted to the base formation in an arrangement wherein it can be rotated relative to the base formation so that end regions thereof project outwardly beyond the base formation (as shown in FIG. 7a) thereby preventing the locking device from passing through said aperture in the base plate of the mounting block 29. The twist formation 35 can again be rotated relative to the base formation 33 so as not to project outwardly (as is shown in FIG. 7a) thereby permitting the twist locking device to pass through the aperture in the base plate and the mounting block to be released from the twist lock. In use, the secure mounting of the tanks 20.1 and 20.2 to the load deck 10 provided by the releasable engagement of the twist locks 28 and the mounting blocks 29, ensures that the tanks are securely mounted to the load deck when carrying fluid freight in their lowered positions. As explained above, the twist lock devices 31 can be removed from the mounting blocks in order to again release the mounting blocks 29 and thereby permit lifting of the tanks into their raised positions.

It will be appreciated that the tanks 20.1 and 20.2 are each releasably connected to the lifting arrangements 30. The connection to the lifting arrangements permits the tanks to be disconnected from the lifting arrangements to permit separation of the tanks from the lifting arrangements when the twist locks 28 and the mounting blocks 29 are disengaged. In use, this is achieved by disconnecting the shackles of the chains 38.1 and 38.2 from the lugs projecting from the mounting blocks 29 and disconnecting the shackles at the lower ends of the chains 56.1 and 56.2 from the lugs 58 projecting from the load deck 10, thereby permitting the tanks to be raised for replacement or for maintenance or repair purposes.

With reference to FIGS. 1 to 9 of the drawings, it can be seen that a lifting arrangement 30 is disposed at opposite ends of the tanks, with one of the lifting arrangements 30 being located at the front end of the trailer, another one of the lifting arrangements being located at the rear end of the trailer and the remaining two lifting arrangements being located back to back at inner ends of the tanks 20.1 and 20.2.

The container arrangement 18 includes rigid panels 60 which are mounted to the load deck 10 in upright configurations so as to form covers for the lifting arrangements when in their retracted positions. Each lifting arrangement 30 includes a box-like casing 62 which houses an upper end region of the lifting arrangement when it is in its extended position. The panels 60 and the casing 62 therefore together cover the lifting arrangement in its retracted and extended positions. As will be described in further detail below, the panels 60 also serve to close-off opposite ends of the stowage compartments defined between the tanks and the load deck when the tanks are in their raised positions.

In use, as mentioned hereinabove, when the tanks 20.1 and 20.2 are in their raised positions, stowage compartment 64.1 and 64.2, respectively, are defined under the tanks within which general dry freight can be stowed on the load deck 16. In FIGS. 8 and 9 of the drawings, it can be seen that general dry freight in the form of boxes 65 supported on pallets, are located on the load deck within the stowage compartments defined below the tanks. The container arrangement includes straps 66 for securing the boxes in place and preventing the boxes from sliding off the load deck at its open sides. Furthermore, the container arrangement includes cargo netting 68 of an elastomeric material which can be pulled over the boxes and secured to hooks along side edges of the load deck to thereby securely holding the boxes in place.

With reference to FIGS. 10 to 15, another embodiment of the freight carrier in accordance with the invention, is designated generally by the reference numeral 100. The freight carrier 100 is identical to the freight carrier 10, with the only difference being that the lifting means is in the form of a number of hydraulically-operable piston/cylinder lifting arrangements 300. As such, those features of the freight carrier 100 which are the same as and/or similar to those of the freight carrier 10 are designated by the same and/or similar reference numerals. As for the freight carrier 10, the freight carrier 100 has two tanks 20.1 and 20.2 which are supported on the load deck 16 and which are raised by the lifting arrangements 300 into raised positions so as to define stowage compartments 64 under the tanks within which general dry freight can be stowed and supported on the load deck 16.

It will be appreciated that although reference is made to the piston/cylinder lifting arrangements being hydraulically-operable, substantially the same configuration will apply to a pneumatically-operable lifting arrangement. Therefore, in the specification where reference is made to the lifting arrangement being hydraulically-operable, it will be appreciated that such reference must be interpreted to include a reference also to the lifting arrangement being pneumatically-operable.

Figure 12:
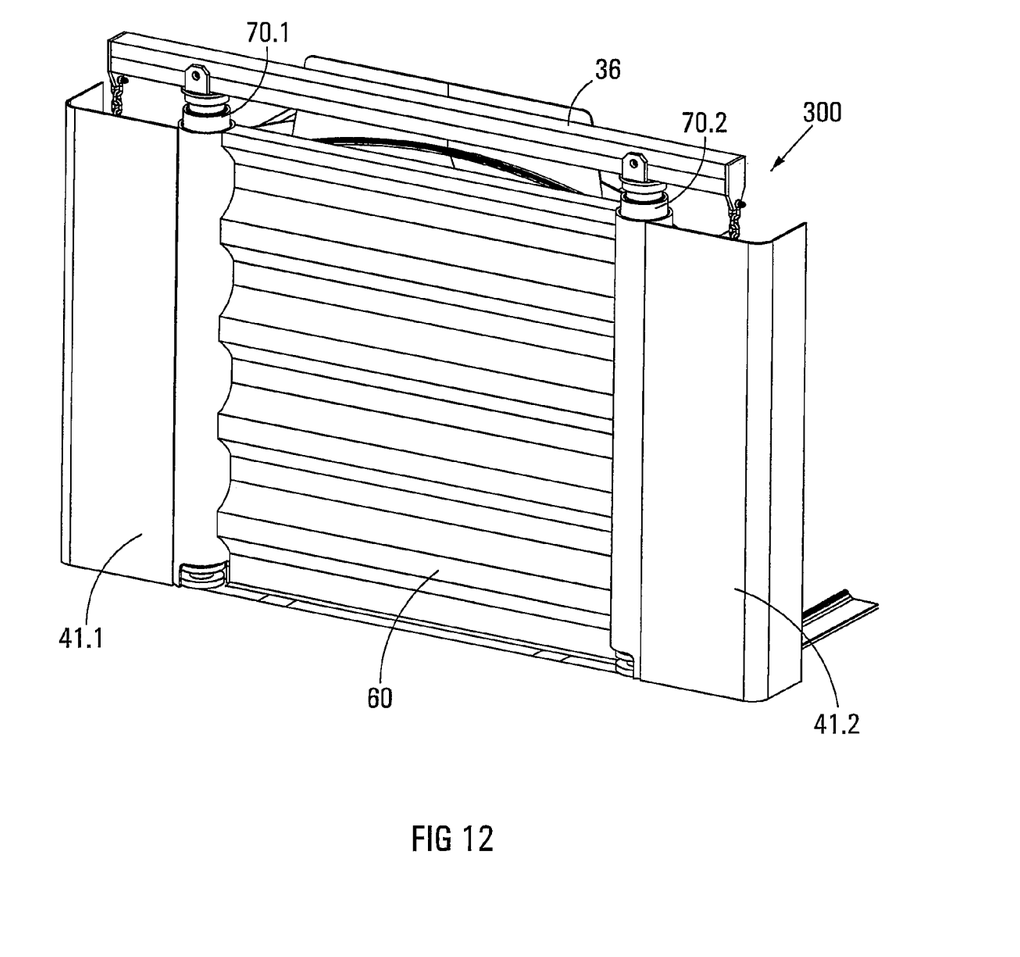
FIG. 12 shows an enlarged perspective view of an hydraulically-operable lifting arrangement of the freight container of FIG. 10, with the lifting arrangement in a retracted position.
Figure 13:
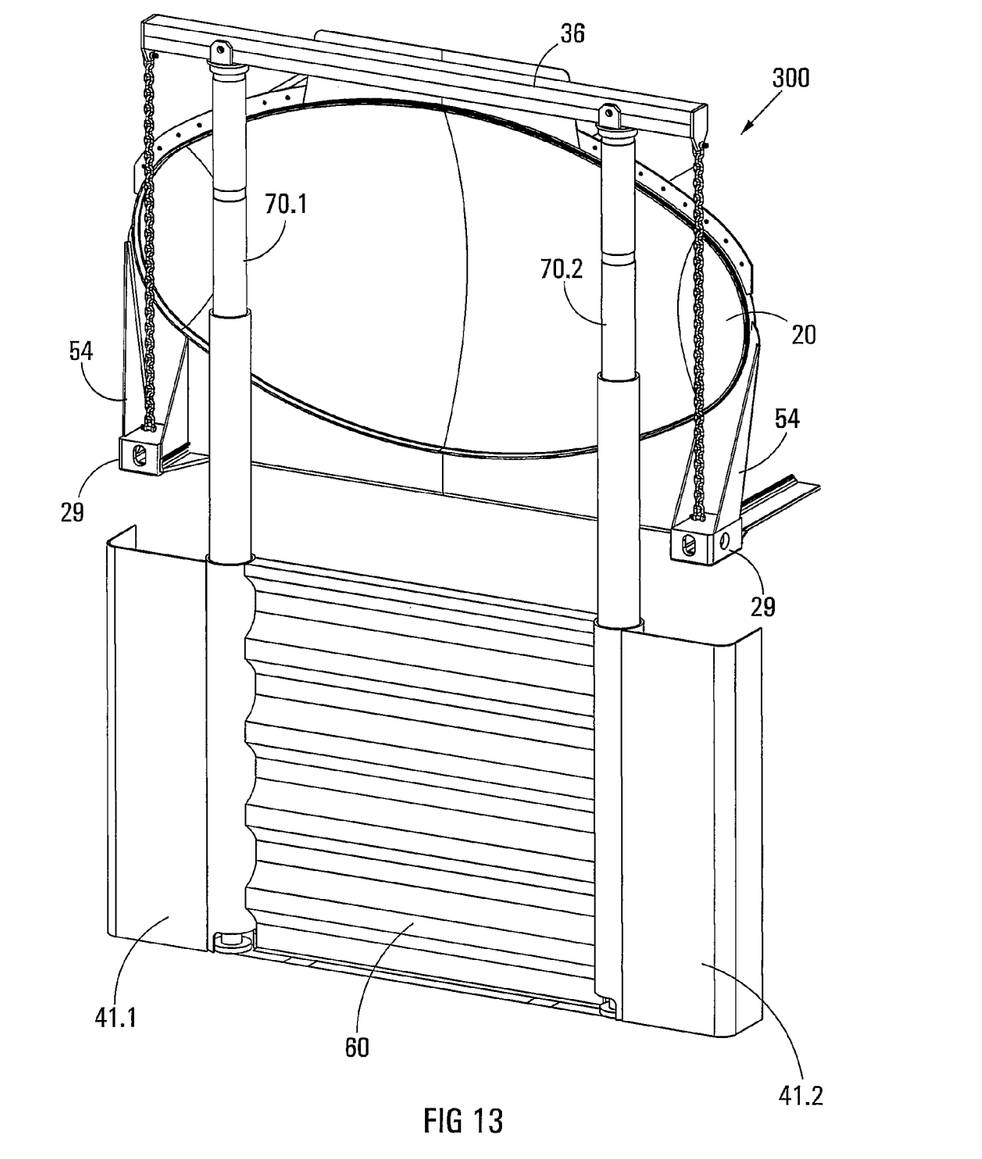
FIG. 13 shows an enlarged perspective view of the hydraulically-operable lifting arrangement of the freight carrier of FIG. 10, with the lifting arrangement in an extended position.

The actuator of the lifting arrangement 300 comprises a pair of telescopically extendable and retractable hydraulic rams 70.1 and 70.2 which are connected at their upper ends to the beam 36 and displaceable between retracted positions (as shown in FIG. 12) and extended positions (as shown in FIG. 13).

In FIGS. 10 to 15, the upper casings 62 have been omitted for clarity. The lifting arrangements 300 will, however, include these casings.

Figure 10:
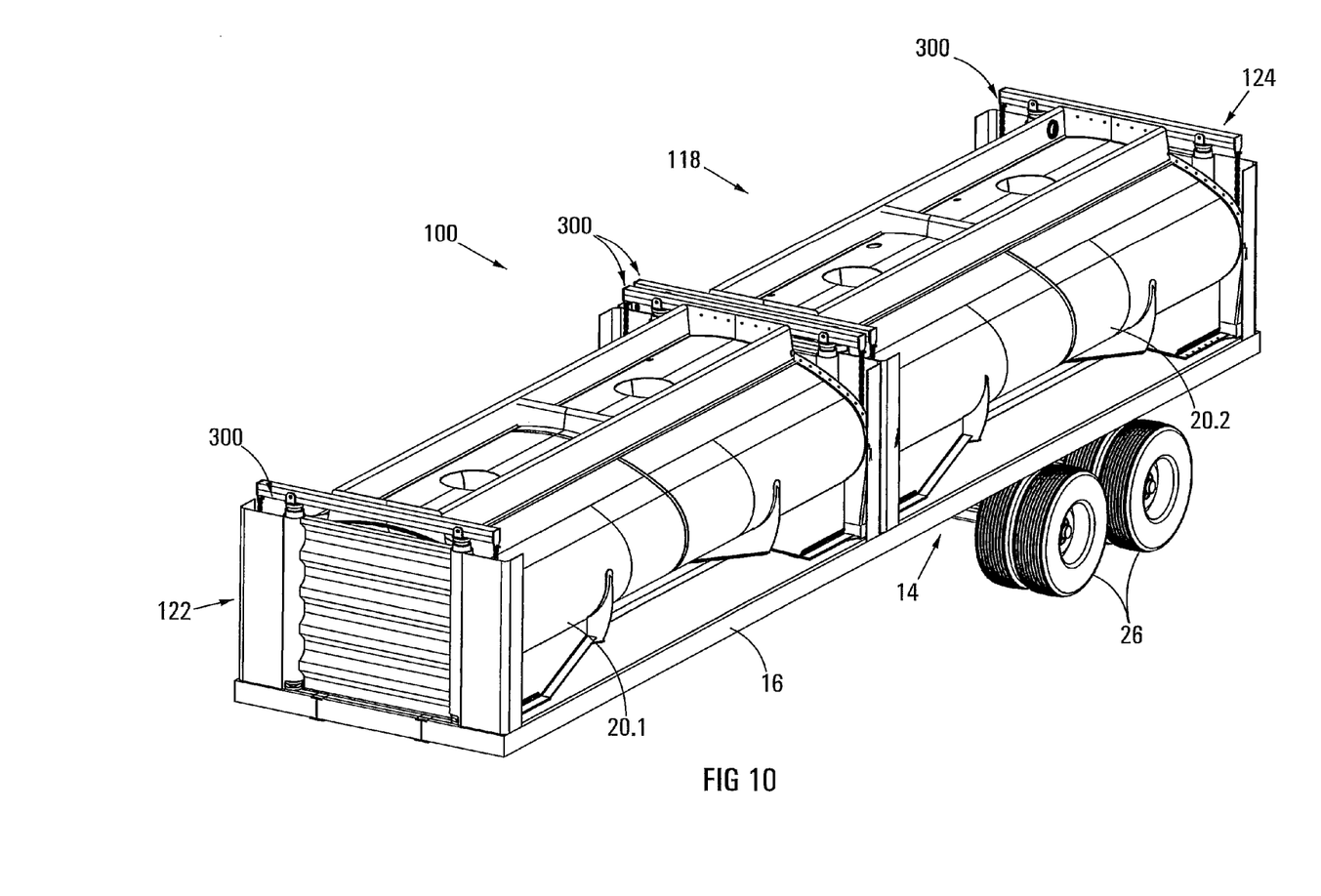
FIG. 10 shows a perspective view from the front, of another embodiment of a freight carrier in accordance with the invention, having hydraulically-operable hydraulic lifting arrangements, with the tanks in their lowered positions.
Figure 11:
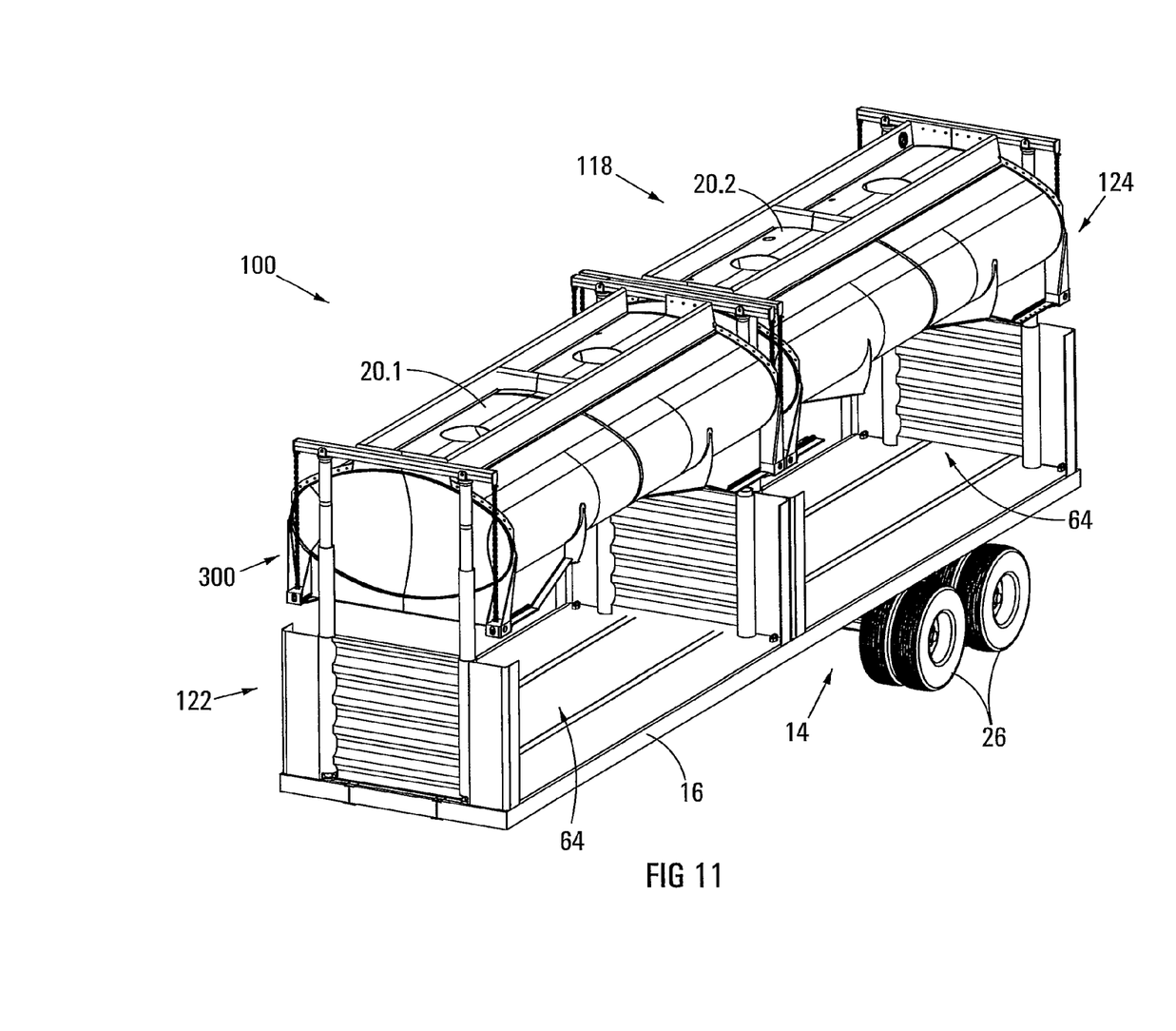
FIG. 11 shows a perspective view from the front, of the freight carrier of FIG. 10, with the tanks in their raised positions.
Figure 14:
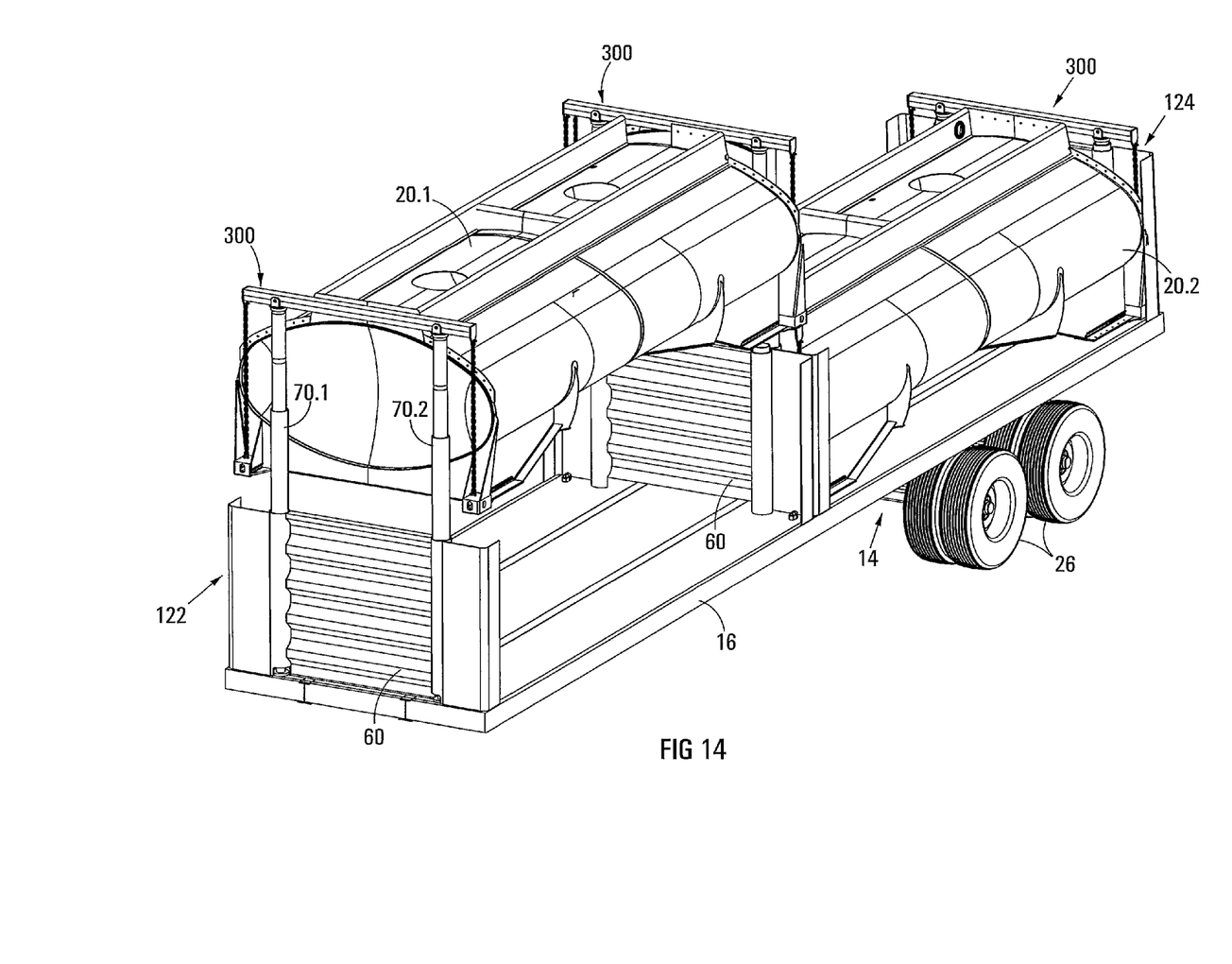
FIG. 14 shows a perspective view from the front, of the freight carrier of FIG. 10, with one of the tanks in a raised position and the other tank in a lowered position.
Figure 15:
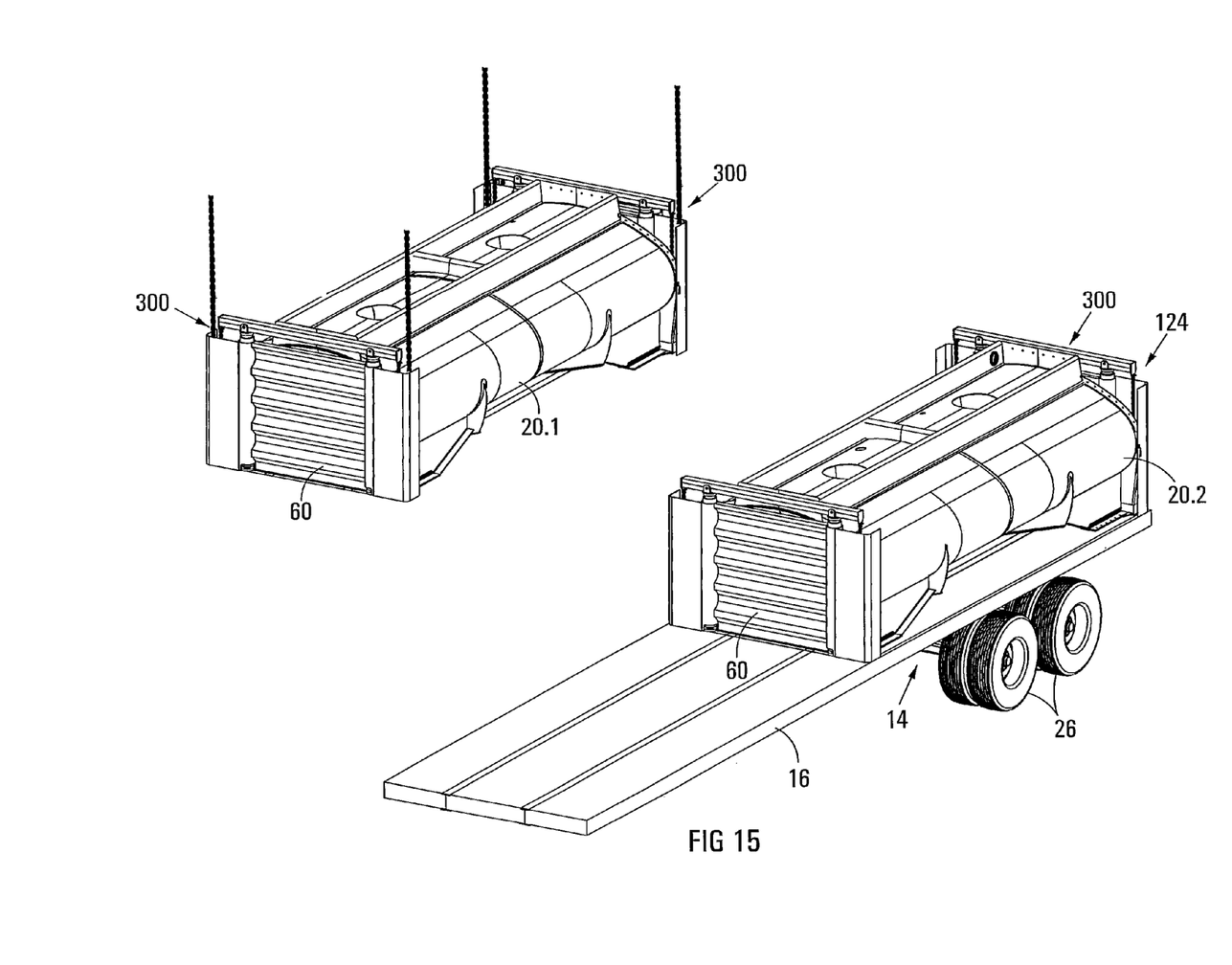
FIG. 15 shows a perspective view from the front, of the freight carrier of FIG. 10, with one of the tanks lifted off the lifting arrangements.

It will be appreciated that the lifting arrangements for each tank operate independently and as is illustrated in FIG. 14, the tanks can be raised independently of each other. As such, if a relatively small dry freight cargo is required to be transported by the carrier, it is possible to only raise one of the tanks for stowage of cargo under the tank, while the other tank remains in its lowered position. With reference to FIG. 10 of the drawings, both tanks 20.1 and 20.2 are shown in their lowered positions for transporting liquid freight, while in FIG. 11 of the drawings, both tanks are shown raised so as to define stowage compartments under the tanks within which general dry freight can be stowed and supported on the load deck 16.

The lifting arrangements 30 and 300 are removeably mounted to the load deck 16. In addition, the panels 60 are also removeably mounted to the load deck 16 thereby permitting the removal of each of the tanks, together with the lifting arrangements and end panels associated therewith.

It will be appreciated that the freight carrier in accordance with the invention avoids the problem of deadheading by providing for the transport of liquid freight with the tanks in lowered positions when travelling in one direction and with one or both of the tanks in raised positions with the tanks being empty, general dry freight can be stowed in the stowage compartments defined under the tanks.

The freight carrier in accordance with the invention complies with ADR regulations in that general dry freight is supplied underneath the tanks as opposed to positioning general dry freight on top of tanks as was done previously by others. The United States Department of Transport (DOT) codes for the construction of dangerous goods road tankers, prescribe minimum radii for prohibit the use of tankers that are squarish in cross-sectional profile or tankers that have flatter (large radius) sides. The invention thus complies with the ADR regulations and DOT codes considered necessary for the safe transportation of dangerous goods in that the tanks are elliptical in shape.

The flatbed trailer in accordance with the invention provides for general dry freight, particularly palletized dry freight, to be supported on a flat deck which provides for stable, secure support of the dry freight. The tanks are also securely mounted to the flat load deck by the twist lock/mounting block locking arrangements to ensure a stable, secure mounting when conveying fluid in the tanks.

The twist lock/mounting blocks locking arrangements are widely used. The invention has been designed taking this standard shipping container locking arrangement into account and the invention thus fits exactly onto standard flatbed trailers manufactured to transport shipping containers of the commonly used size of six meters in width and twelve meters in length.

When transporting fluid freight in the tanks with the tanks lowered and when transporting dry freight with the empty tanks raised, a stable centre of gravity for transporting freight is provided by the freight carrier in accordance with the invention.

The invention claimed is:

1. A freight carrier for the carriage of fluid freight and general dry freight, the freight carrier being of the side loading type and including:
    a vehicle chassis including a load deck having open sides on which the general dry freight can be supported; and
    a container arrangement which is mounted to the load deck of the vehicle chassis, the container arrangement providing for the carriage of fluid freight and general dry freight and including:
    a bulk container vessel for holding the fluid freight, the bulk container vessel having an operative front end and an operative rear end and being supported on the load deck;
    lifting means mounted to the freight carrier, for displacing the bulk container vessel between a lowered position wherein the bulk container vessel is disposed adjacent the load deck and a raised position wherein the bulk container vessel is spaced above the load deck so as to define a stowage compartment between the load deck and the bulk container vessel in which the general dry freight can be stowed and supported on the load deck, the lifting means comprising a first lifting arrangement located at the front end of the bulk container vessel and a second lifting arrangement located at the rear end of the bulk container vessel for lifting the bulk container vessel at its front and rear ends, respectively,
    the container arrangement including a rigid front panel which is mounted to the load deck in an upright orientation at the front end of the bulk container vessel and a rigid rear panel which is mounted to the load deck in an upright orientation at the rear end of the bulk container vessel, each panel being of a height which is at least equal to a height of the stowage compartment, thereby to substantially close off the front and rear ends of the stowage compartment.

2. The freight carrier as claimed in claim 1, wherein the first lifting arrangement comprises a first scissor jack arrangement disposed at the front end of the bulk container vessel and the second lifting arrangement comprises a second scissor jack arrangement disposed at the rear end of the bulk container vessel.

3. The freight carrier as claimed in claim 1, wherein the first lifting arrangement comprises a first hydraulically-operable piston/cylinder lifting arrangement at the front end of the bulk container vessel and the second lifting arrangement comprises a second hydraulically-operable lifting arrangement at the rear end of the bulk container vessel.

4. The freight carrier as claimed in claim 1, wherein the first lifting arrangement comprises a first pneumatically-operable piston/cylinder lifting arrangement at the front end of the bulk container vessel and the second lifting arrangement comprises a second pneumatically-operable piston/cylinder lifting arrangement at the rear end of the bulk container vessel.

5. The freight carrier as claimed claim 1, which includes releasable mounting means for releasably securely mounting the bulk container vessel to the load deck of the vehicle chassis when the bulk container vessel is in its lowered position.

6. The freight carrier as claimed in claim 1, wherein the bulk container vessel is releasably connected to the lifting means in an arrangement permitting the bulk container vessel to be disconnected from the lifting means thereby to permit the separation of the container vessel from the lifting means.

* * * * *